(12) United States Patent
Taylor et al.

(10) Patent No.: US 7,589,497 B2
(45) Date of Patent: Sep. 15, 2009

(54) FIELD EXPANDABLE BATTERY SYSTEMS AND RELATED METHODS

(75) Inventors: Jay L. Taylor, Gerogetown, TX (US); Youssef Daou, Austin, TX (US); Leszek Brukwicz, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 228 days.

(21) Appl. No.: 11/363,626

(22) Filed: Feb. 28, 2006

(65) Prior Publication Data

US 2007/0216354 A1      Sep. 20, 2007

(51) Int. Cl.
*H02J 7/00*      (2006.01)
(52) U.S. Cl. ...................................... 320/116; 320/120
(58) Field of Classification Search ................. 320/116, 320/110, 114, 117, 120
See application file for complete search history.

(56) References Cited

U.S. PATENT DOCUMENTS

| | | | | |
|---|---|---|---|---|
| 5,784,626 A | | 7/1998 | Odaohara | 395/750.01 |
| 5,818,200 A | | 10/1998 | Cummings et al. | 320/116 |
| 5,955,867 A | * | 9/1999 | Cummings et al. | 320/107 |
| 6,031,356 A | * | 2/2000 | Harada et al. | 320/119 |
| 6,081,096 A | | 6/2000 | Barkat et al. | 320/124 |
| 6,160,702 A | | 12/2000 | Lee et al. | 361/683 |
| 6,509,717 B2 | * | 1/2003 | Lee | 320/116 |
| 6,608,470 B1 | * | 8/2003 | Oglesbee et al. | 320/136 |
| 6,724,588 B1 | * | 4/2004 | Cummings et al. | 361/18 |
| 6,892,147 B2 | | 5/2005 | Bui et al. | 702/63 |
| 7,202,631 B2 | * | 4/2007 | Breen et al. | 320/132 |
| 2004/0257041 A1 | | 12/2004 | Nagaoka | 320/128 |
| 2004/0263123 A1 | * | 12/2004 | Breen et al. | 320/128 |

* cited by examiner

*Primary Examiner*—Adolf Berhane
*Assistant Examiner*—Nguyen Tran
(74) *Attorney, Agent, or Firm*—O'Keefe, Egan, Peterman & Enders, LLP

(57) ABSTRACT

Field expandable battery pack systems and related methods are disclosed that allow for increased battery life while reducing cost and still meeting shipping regulations. In part, the expanded battery system includes a primary battery having a battery management unit (BMU) and additional expansion batteries that couple to the primary battery and are managed together by the shared-BMU within the primary battery. Each battery has its own protection circuitry, and the batteries can be lithium-ion batteries. As such, multiple batteries can be shipped together and then combined by a user to achieve a desired level of battery capacity that is managed as a single battery through the use of the shared-BMU.

20 Claims, 3 Drawing Sheets

FIELD EXPANDABLE BATTERY SYSTEMS AND RELATED METHODS

TECHNICAL FIELD OF THE INVENTION

This invention relates to techniques for the utilizing batteries in information handling systems and, more particularly, to battery capacity for portable computer systems.

BACKGROUND

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Certain information handling system, such as notebook computer systems, are designed to operate on battery power and/or power from a powered outlet. With respect to battery operation, end-user customers often desire long term operation on battery power. The length of battery operation in part depends upon the charge capacity of the battery. With respect to batteries that rely upon lithium-ion chemistry, one limitation to the charge capacity for such lithium-ion batteries is created by hazardous chemical shipping regulations. For example, in the United States of America, only a certain amount of lithium can be included in a single device before a hazardous material designation must be placed on the device. Currently, this limit is 8.0 grams or less of equivalent lithium content. This amount of lithium correlates to a battery life of about 96 Watt hours (Whr) for a current lithium-ion battery of the type commonly used in portable computer systems. And each battery must have protective circuitry. Due to these limitations, battery capacity for information handling systems is effectively capped. Thus, at the present time, a portable computer user is not able to expand the capacity of the portable battery as per the user's needs, and there are customer demands for the energy storage with higher than 96 Whr capacity, especially for ultra mobile computer devices.

To resolve this problem, some information handling systems, such as portable computers, are configured to allow use of two independent lithium-ion batteries or battery packs. In operation, such system first uses the power from one battery while isolating the second battery. Once that charge on the first battery has been depleted, the system then begins to use the power from second battery while isolating the first battery. In this way, the battery life of the portable information handling system can be extended beyond the 96 Whr limit created by the lithium shipping regulations. Another effort is an attempt to lobby governmental entities to increase the limit on lithium hazardous material designations. However, there is till need for efficient and cost-effective solutions to this battery capacity problem.

SUMMARY OF THE INVENTION

The present invention provides field expandable battery pack systems and related methods that allow for increased battery capacity while reducing cost and still meeting shipping regulations. In part, the present invention provides a primary battery having a battery management unit (BMU) and additional expansion batteries that couple to the first battery and are managed together by the shared-BMU within the primary battery. Each battery has its own protection circuitry. As such, multiple batteries can be shipped together and then combined by a user to achieve a desired level of battery capacity that is managed as a single battery through the use of the shared-BMU. As described below, other features and variations can be implemented, if desired, and related systems and methods can be utilized, as well.

In one aspect, the present invention is an information handling system configured to be powered by a battery or an alternating current to direct current (AC/DC) converter including an alternating current to direct current (AC/DC) converter, a load coupled to the AC/DC converter where the load represents powered circuitry for an information handling system, a charger coupled to the AC/DC converter, a primary battery coupled to the charger and to the load, and an expansion battery. In addition, the primary battery has a battery management unit (BMU) and an expansion battery interface where the expansion battery interface includes a positive terminal, a negative terminal and a BMU control connection. Similarly, the expansion battery has an expansion battery interface including a positive terminal, a negative terminal and a BMU control connection. The expansion battery interfaces are then coupled together such that the BMU sends control signals to the expansion battery through the BMU control connections, and the primary battery and the expansion battery together provide battery power to the load. In a further embodiment, the system includes a second expansion battery having an expansion battery interface that couples to a second expansion battery interface for the first expansion battery. Still further, each battery can include protection circuitry coupled to the positive terminal of each battery. As described below, other features and variations can be implemented, if desired, and related methods can be utilized, as well. Still further, the primary battery and the expansion batteries can be lithium-ion batteries.

In another respect, the present invention is an expanded battery system including at least one primary battery and at least one expansion battery. The primary battery has a battery management unit (BMU) and an expansion battery interface where the expansion battery interface includes a positive terminal, a negative terminal and a BMU control connection. Similarly, the expansion battery has an expansion battery interface including a positive terminal, a negative terminal and a BMU control connection. The expansion battery interfaces are then coupled together such that the BMU sends control signals to the expansion battery through the BMU control connections, and the primary battery and the expansion battery together provide battery power to a load. In a further embodiment, the system includes a second expansion battery having an expansion battery interface that couples to a second expansion battery interface for the first expansion battery. Still further, each battery can include protection circuitry coupled to the positive terminal of each battery. As described below, other features and variations can be implemented, if desired, and related methods can be utilized, as well. Still further, the primary battery and the expansion batteries can be lithium-ion batteries.

In a further embodiment, the present invention is a method of expanding battery capacity for an information handling system including providing a primary battery, providing an expansion battery, coupling together expansion battery interfaces of the primary battery and the expansion battery to form an expanded battery system, operating the primary battery and the expansion battery to jointly provide power to a load for an information handling system, and utilizing the BMU within the primary battery to at least in part control operations of the primary battery and the expansion battery through the BMU control connections. The expansion battery interfaces can include a positive terminal, a negative terminal and a BMU control connection. In a further embodiment, the method includes providing a second expansion battery having an expansion battery interface coupled to a second expansion battery interface for the first expansion battery and operating the primary battery and the expansion batteries to provide power to the load for the information handling system. Still further, the primary battery and the expansion battery can be lithium-ion batteries. As described below, other features and variations can be implemented, if desired, and related systems can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Figure 1:
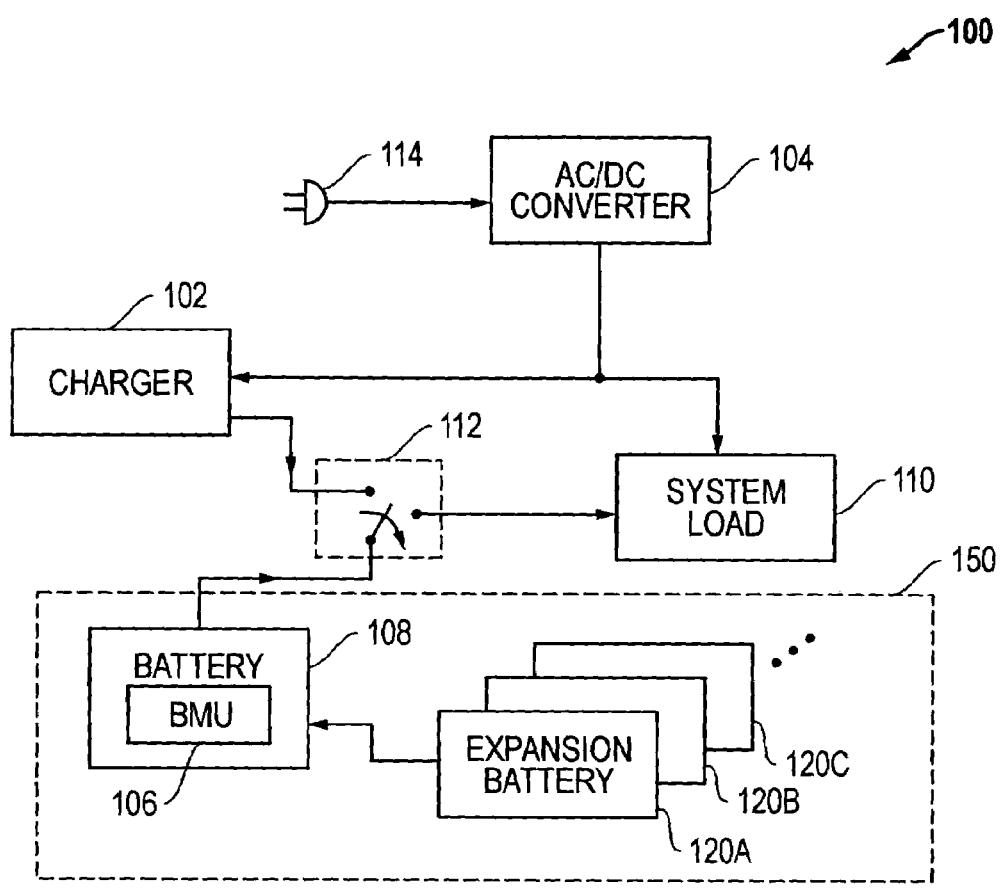
FIG. 1 is a block diagram for an information handling system that utilizes a battery and a charger to charge the battery when plugged into a power source.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present invention relates to batteries used by information handling systems and, more particularly, to battery capacity for portable computer systems. According to the present invention, field expandable battery pack systems and related methods are provided that allow for increased battery life while reducing cost and still meeting hazardous materials shipping regulations. In part, the present invention provides a primary battery having a battery management unit (BMU) and additional expansion batteries that couple to the primary battery and are managed together by the share-BMU. Each battery has its own protection circuitry. As such, multiple batteries can be shipped together and then combined by a user to achieve a desired level of battery capacity that is managed as a single battery through the use of a shared-BMU within the primary battery.

As described further below, the expandable battery system architecture of the present invention allows power management and expandability through a master battery pack and expansion or slave battery packs. Although joining smart batteries in parallel is not new, the use of a single smart battery BMU controller to manage multiple cell stacks within separate battery packs, according to the present invention, is new and advantageous. The present invention can take advantage of the same safety and control mechanisms that already exist for smart batteries while still allowing battery systems to be expanded in the field by the customer according to customer needs for battery capacity. As such, the BMU controller within the primary battery manages the charge/discharge cycle life and function of as many expansion battery packs as are connected together for a given application. The master battery pack will contain all existing battery control circuits as part of the battery management unit (BMU) and contain current protection circuitry such as charge flow interrupting devices (charge FET, discharge FET, fuse) and associated protective circuits that are available in current smart batteries.

The master battery pack can be shipped with the portable computer to the user and will be field expandable. The user can then connect additional expansion or slave batteries as per user demands in order to increase the battery life. The expansion battery pack, however, does not need to contain a separate BMU unit. Rather, the expansion battery can use BMU located within the primary battery pack thereby creating a shared-BMU solution. The expandable battery pack can still have any desired protection circuitry that may be required for the battery. For example, this protection circuitry can include standard protection circuitry that is designed to protect the user against exposed battery voltages at the battery connectors. By adding expansion battery packs to the primary batter pack and using a shared-BMU within the primary battery pack, the user can enjoy a longer life portable design compared to the existing technology. The present invention thereby increases battery efficiency and reduces the total cost of the battery system as compared to multiple battery systems where each battery includes a BMU.

Looking now to FIG. 1, a block diagram is depicted for an information handling system 100 that utilizes a battery 108 and a charger 102 to charge the battery 108 when plugged into a power source. As depicted, the plug 114 is configured to be plugged into a wall power socket and is coupled to an AC/DC converter 104. The AC/DC converter 104 is in turn coupled to provide power to the information handling system load 110. In addition, the AC/DC converter 104 is coupled to provide power to the charger 102. The switch 112 is utilized to allow the battery 108 to connect to charger 102 in order to be charged or to connect to the information handling system load 110 in order to provide battery power to the information handling system load 110 when there is no external power supply connected. The battery 108 includes a battery management unit (BMU) 106 that helps control the operation of the battery in its charging and discharging cycles.

According to the present invention, the battery 108 is part of a field expandable battery system 150 that is utilized to provide expanded battery capacity for the information handling system 100. As discussed in more detail below, one or more additional batteries 120A, 120B, 120C . . . can be coupled in parallel with the primary battery 108 to provide increased battery capacity. In addition, these additional batteries 120A, 120B, 120C . . . can be managed by the BMU 106 within the battery 108. As discussed herein, the battery 108 is the primary battery because it includes a BMU 106 that is being shared by multiple batteries for battery management purposes. The batteries 120A, 120B, 120C . . . are expansion batteries because they are coupled to the primary battery 108 and are using a shared-BMU 106 for their battery management.

It is noted that a variety of configurations are possible for a field expandable battery system according to the present invention. For example, one or more primary batteries with shared-BMUs could be used, and one or more expansion batteries could be used for each primary battery. In other words, to take advantage of the present invention, it is sufficient to utilize a single primary battery with a shared-BMU and a single expansion battery; however, there are many possible configurations and applications in which the present invention can be utilized.

Figure 2:
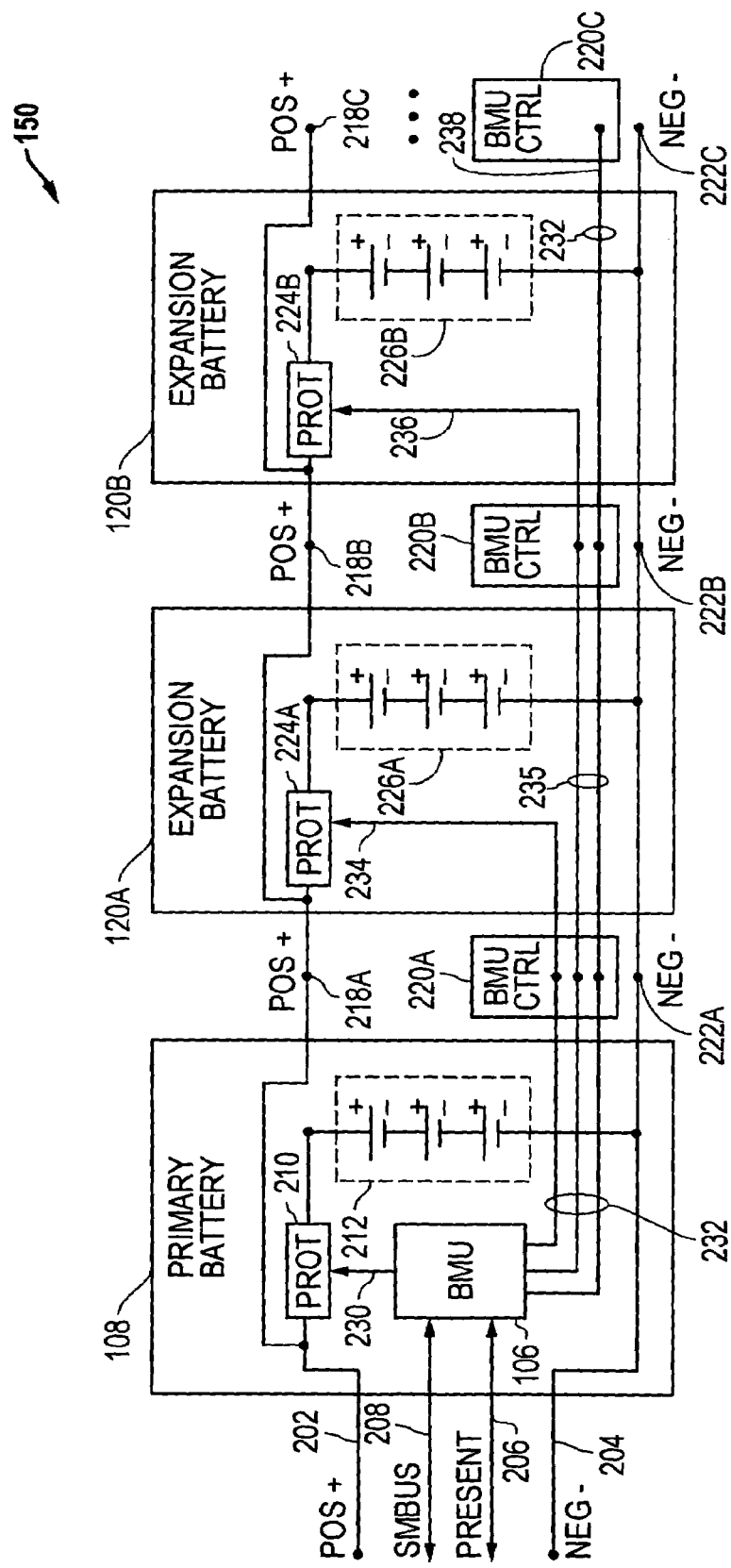
FIG. 2 is a block diagram for an expanded battery system according to the present invention.

FIG. 2 is a block diagram for an expanded battery system 150 according to the present invention. As discussed above, the primary battery 108 includes a BMU 106 that is a shared-BMU that helps control expansion batteries 120A and 120B, as well as primary battery 108. The primary battery 108, the expansion battery 120A and expansion battery 120B each have respective protection circuits in the form of protection circuit (PROT) 210, protection circuit (PROT) 224A, and protection circuit (PROT) 224B. The battery cells for the batteries are represented by battery cells 212 for primary battery 108, battery cells 226A for expansion battery 120A, and battery cells 226B for expansion battery 120B.

Looking to primary battery 108, the BMU 106 is coupled to receive and provide control and status signals to and from other circuitry within the information handling system 100. For example, the BMU 106 can be coupled to the system management bus (SMBUS) 208 that is commonly used in current computer systems. In addition, battery system present (PRESENT) signals 206 can be provided to the BMU 106, which are also signals commonly used in current computer systems to allow a smart battery to know when it is in a system and to allow a system to know it has a battery. It is noted that other control and status signals could be utilized, if desired. The positive terminal (POS+) 202 of the battery 108 is coupled through the protection circuitry (PROT) 210 to the positive side of battery cells 212. The negative terminal (NEG−) 204 is coupled to the negative side of battery cells 212. The BMU 106 has an output signal 230 that is coupled to the protection circuitry (PROT) 210 and helps control the protection circuitry (PROT) 210, which as indicated above can include a charge FET (CFET) for charging control, and discharge FET (DFET) for discharging control, and a fuse for disconnecting the battery terminals in case of a failed battery. Other protection circuitry could also be provided, if desired. In addition, the BMU 106 includes one or more additional signals 232 that are provided for connection to expansion batteries. The primary battery 108 also has positive and negative battery connection terminals for the expansion battery. Thus, in addition to the interface to the circuitry of the information handling system 100, an expansion battery interface is provided for the primary battery 108 that includes positive terminal (POS+) connection point 218A, negative terminal (NEG−) connection point 222A, and shared-BMU control (BMU CTRL) connection points 220A.

The first expansion battery 120A in turn has a first expansion battery interface that will connect to the primary battery 108 or to another expansion battery. In addition, the expansion battery 120A has a second expansion battery interface that will connect to another expansion battery, such as expansion battery 120B. As with the primary battery 108, an expansion battery interface is provided for the expansion battery 120A that includes positive terminal (POS+) connection point 218A, negative terminal (NEG−) connection point 222A, and shared-BMU control (BMU CTRL) connection points 220A. The positive terminal (POS+) connection point 218A is connected through protection circuitry (PROT) 224A to the positive side of battery cells 226A. The negative terminal (NEG−) connection point 222A is connected to the negative side of battery cells 226A. The shared-BMU control (BMU CTRL) connection points 220A provide a control signal 234 that is coupled to the protection circuitry (PROT) 224A and helps control the protection circuitry (PROT) 224A. As indicated above, the protection circuitry (PROT) 224A can include a charge FET (CFET) for charging control, and discharge FET (DFET) for discharging control, and a fuse for disconnecting the battery terminals in case of a failed battery. In addition, one or more additional signals 235 are provided for connection to additional expansion batteries. Finally, a second expansion battery interface is provided for the expansion battery 120A that includes positive terminal (POS+) connection point 218B, negative terminal (NEG−) connection point 222B, and shared-BMU control (BMU CTRL) connection points 220B.

The second expansion battery 120A in turn has a first expansion battery interface that will connect to the primary battery 108 or to another expansion battery, such as expansion battery 120A. In addition, as with the first expansion battery 120A, the second expansion battery 120B has a second expansion battery interface that will connect to another expansion battery, if desired. As with the primary battery 108 and the expansion battery 120A, a expansion battery interface is provided for the expansion battery 120A that includes positive terminal (POS+) connection point 218B, negative terminal (NEG−) connection point 222B, and shared-BMU control (BMU CTRL) connection points 220B. The positive terminal (POS+) connection point 218B is connected through protection circuitry (PROT) 224B to the positive side of battery cells 226B. The negative terminal (NEG−) connection point 222B is connected to the negative side of battery cells 226B. The shared-BMU control (BMU CTRL) connection points 220B provide a control signal 236 that is coupled to the protection circuitry (PROT) 224B and helps control the protection circuitry (PROT) 224B. As indicated above, the protection circuitry (PROT) 224B can include a charge FET (CFET) for charging control, and discharge FET (DFET) for discharging control, and a fuse for disconnecting the battery terminals in case of a failed battery. In addition, one or more additional signals 237 are provided for connection to additional expansion batteries. Finally, a second expansion battery interface is provided for the expansion battery 120B that includes positive terminal (POS+) connection point 218C, negative terminal (NEG−) connection point 222C, and shared-BMU control (BMU CTRL) connection points 220C.

It is noted that the BMU control (BMU CTRL) connection points 220A, 220B, 220C . . . can be implemented as multi-pin connectors, if desired. In addition, the number of possible expansion batteries could be limited so that these connectors can be designed to provide a fixed number of BMU control signals. It is also noted that any number of primary batteries and expansion batteries could be used to form a field expandable battery system according to the present invention. Still further, the nature and type of connections used to couple the primary battery and the expansion batteries could be configured and modified as desired while still taking advantage of the shared-BMU architecture of the present invention.

Figure 3:
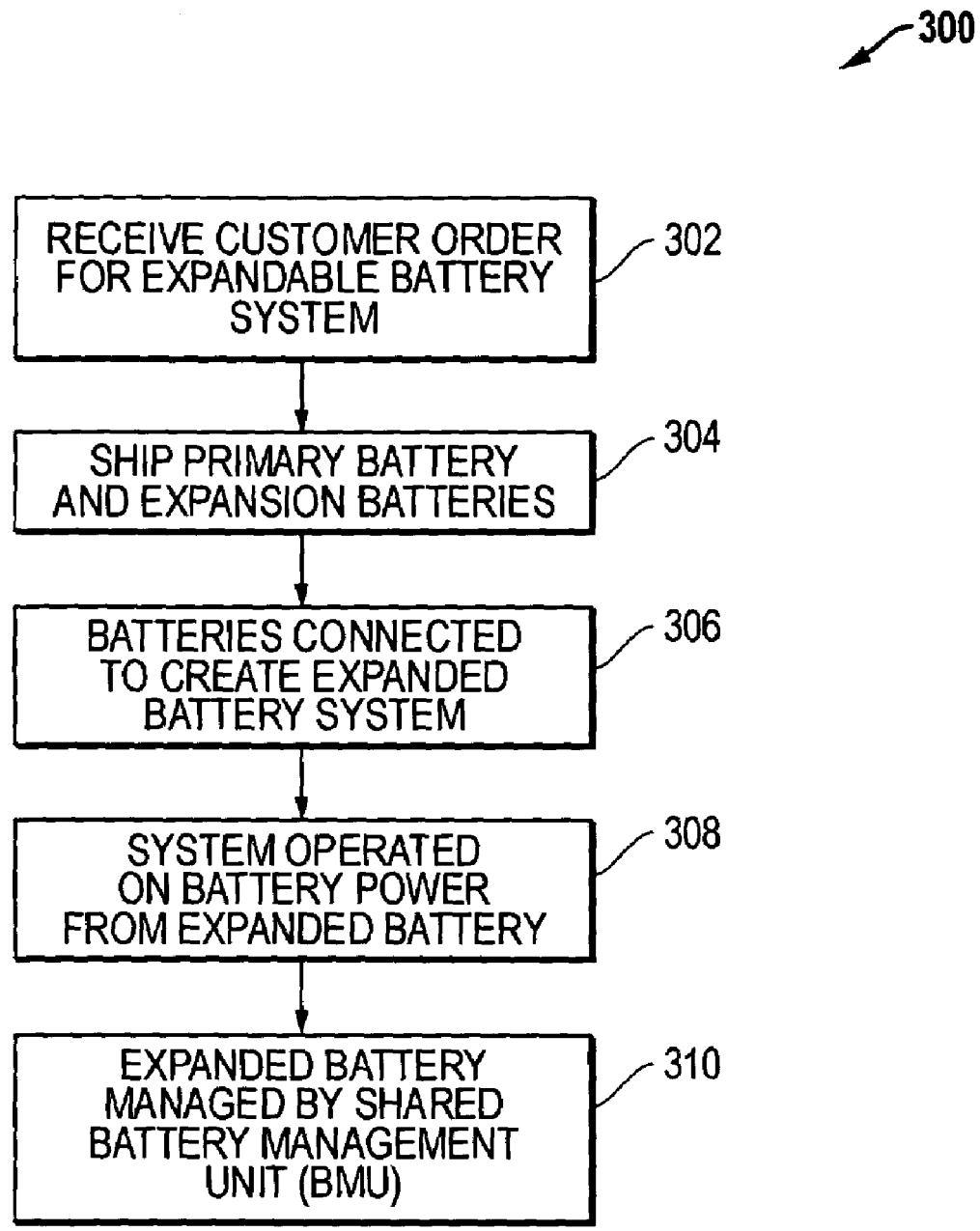
FIG. 3 is a flow diagram for use and management of the expanded battery system of the present invention.

FIG. 3 is a flow diagram 300 for use and management of the expanded battery system of the present invention. In block 302, an order is received from a customer for an expandable battery system. In block 304, the primary battery and the expansion batteries are shipped. In block 306, the primary and expansion batteries are connected together to create an expanded battery system. In block 308, the system is operated on battery power from the expanded battery. And in block 310, the expanded battery is managed by the shared battery management unit (BMU) within the primary battery, as discussed above. It is noted that flow diagram 300 is one example of how a user could acquire and utilize an expanded battery system according to the present invention. For example, the user could acquire a primary battery in a first transaction or shipment and then acquire the expansion batteries in a second transaction or shipment. As would be understood, a wide variety of mechanisms and techniques could be utilized to implement expanded battery systems that utilize one or more shared-BMUs according to the present invention.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. An information handling system configured to be powered by a battery or an alternating current to direct current (AC/DC) converter, comprising:
   an alternating current to direct current (AC/DC) converter;
   a load coupled to the AC/DC converter, the load representing powered circuitry for an information handling system;
   a charger coupled to the AC/DC converter;
   a primary battery coupled to the charger and to the load, the primary battery having an internal battery management unit (BMU) configured to be coupled to an external system management bus and an expansion battery interface, the expansion battery interface including a positive terminal, a negative terminal and a BMU control connection, the BMU control connection being separate from the external system management bus; and
   an expansion battery having an expansion battery interface, the expansion battery interface including a positive terminal, a negative terminal and a BMU control connection, the expansion battery interface being coupled to the expansion battery interface of the primary battery;
   wherein the BMU within the primary battery sends control signals to the expansion battery through the BMU control connections and the primary battery and the expansion battery together provide battery power to the load.

2. The information handling system of claim 1, wherein the expansion battery further comprises a second expansion battery interface, the second expansion battery interface including a positive terminal, a negative terminal and a BMU control connection.

3. The information handling system of claim 2, further comprising a second expansion battery having an expansion battery interface, the expansion battery interface including a positive terminal, a negative terminal and a BMU control connection, the expansion battery interface being coupled to the second expansion battery interface of the first expansion battery.

4. The information handling system of claim 3, wherein the BMU sends control signals to the first and second expansion batteries through the BMU control connections, and the primary battery and the expansion batteries together provide battery power to the load.

5. The information handling system of claim 1, wherein the primary battery and the expansion battery further each comprise protection circuitry coupled to the positive terminal of each battery.

6. The information handling system of claim 5, wherein the protection circuitry comprises a charge FET, a discharge FET, and a fuse.

7. The information handling system of claim 5, wherein the BMU within the primary battery at least in part controls the protection circuitry within the expansion battery.

8. An expanded battery system, comprising:
   a primary battery having an internal battery management unit (BMU) configured to be coupled to an external system management bus and an expansion battery interface, the expansion battery interface including a positive terminal, a negative terminal and a BMU control connection, the BMU control connection being separate from the external system management bus; and
   an expansion battery having an expansion battery interface, the expansion battery interface including a positive terminal, a negative terminal and a BMU control connection, the expansion battery interface being coupled to the expansion battery interface of the primary battery;
   wherein the BMU within the primary battery sends control signals to the expansion battery through the BMU control connections, and the primary battery and the expansion battery are configured to jointly provide battery power.

9. The expanded battery system of claim 8, wherein the expansion battery further comprises a second expansion battery interface, the second expansion battery interface including a positive terminal, a negative terminal and a BMU control connection.

10. The expanded battery system of claim 9, further comprising a second expansion battery having an expansion battery interface, the expansion battery interface including a positive terminal, a negative terminal and a BMU control connection, the expansion battery interface being coupled to the second expansion battery interface of the first expansion battery.

11. The expanded battery system of claim 10, wherein the BMU sends control signals to the expansion batteries through the BMU control connections, and the primary battery and the expansion batteries are configured to jointly provide battery power.

12. The expanded battery system of claim 8, wherein the primary battery and the expansion battery further each comprise protection circuitry coupled to the positive terminal of each battery.

13. The expanded battery system of claim 12, wherein the protection circuitry comprises a charge FET, a discharge FET, and a fuse.

14. The expanded battery system of claim 12, wherein the BMU within the primary battery at least in part controls the protection circuitry within the expansion battery.

15. The expanded battery system of claim 8, wherein the primary battery and the expansion battery comprise lithium-ion batteries.

16. A method of expanding battery capacity for an information handling system, comprising:
   providing a primary battery having an internal battery management unit (BMU) configured to be coupled to an external system management bus and an expansion battery interface including a positive terminal, a negative terminal and a BMU control connection, the BMU control connection being separate from the external system management bus;
   providing an expansion battery having expansion battery interface including a positive terminal, a negative terminal and a BMU control connection;
   coupling together the expansion battery interfaces of the primary battery and the expansion battery to form an expanded battery system;
   operating the primary battery and the expansion battery to jointly provide power to a load for an information handling system; and
   utilizing the BMU within the primary battery to at least in part control operations of the primary battery and the expansion battery through the BMU control connections.

17. The method of claim 16, further comprising providing a second expansion battery interface for the expansion battery, the second expansion battery interface including a positive terminal, a negative terminal and a BMU control connection.

18. The method of claim 17, further comprising providing a second expansion battery having an expansion battery interface, the expansion battery interface including a positive terminal, a negative terminal and a BMU control connection; coupling the expansion battery interface to the second expansion battery interface of the first expansion battery; and operating the primary battery and the expansion batteries to provide power to the load for the information handling system.

19. The method of claim 18, further comprising utilizing the BMU within the primary battery to at least in part control operations of the primary battery and the expansion batteries through the BMU control connections.

20. The method of claim 16, wherein the primary battery and the expansion battery comprise lithium-ion batteries.

\* \* \* \* \*

UNITED STATES PATENT AND TRADEMARK OFFICE
CERTIFICATE OF CORRECTION

PATENT NO. : 7,589,497 B2  
APPLICATION NO. : 11/363626  
DATED : September 15, 2009  
INVENTOR(S) : Taylor et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 262 days.

Signed and Sealed this

Twenty-first Day of September, 2010

David J. Kappos  
*Director of the United States Patent and Trademark Office*